United States Patent [19]

Geary et al.

[11] Patent Number: 4,801,680
[45] Date of Patent: Jan. 31, 1989

[54] HYDROXYALKYLAMIDE POWDER COATING CURING SYSTEM

[75] Inventors: Denise M. Geary, Franklin, Wis.; Paul H. Pettit, Jr., Allison Park; Marvin L. Kaufman, Pittsburgh, both of Pa.; Susan K. Vicha, North Royalton, Ohio

[73] Assignee: PPG Industries, Inc., Pittsburgh, Pa.

[21] Appl. No.: 139,358

[22] Filed: Dec. 30, 1987

[51] Int. Cl.$^4$ ............................................. C08G 81/00
[52] U.S. Cl. .................................... 528/272; 528/288; 528/292; 528/296; 525/50; 525/418; 525/420
[58] Field of Search ............... 528/272, 288, 292, 296; 525/50, 418, 420

[56] References Cited

U.S. PATENT DOCUMENTS

| | | | |
|---|---|---|---|
| 4,076,917 | 2/1978 | Swift et al. ............................ | 526/49 |
| 4,101,606 | 7/1978 | Cenci et al. ................... | 260/857 UN |
| 4,115,637 | 9/1978 | Cenci et al. ............................ | 526/56 |
| 4,138,541 | 2/1979 | Cenci et al. ............................ | 526/303 |
| 4,346,144 | 8/1982 | Craven ................................. | 428/336 |
| 4,727,111 | 2/1988 | Pettit et al. .......................... | 525/190 |

OTHER PUBLICATIONS

Journal of Coatings Technology, *B–Hydroxyalkylamides, Low Polluting Crosslinkers for Carboxyl Containing Polymers*, James Lomax and Graham Swift, vol. 50, No. 643, Aug. 1978, pp. 49–55.

*Primary Examiner*—John Kight
*Assistant Examiner*—Samuel A. Acquah
*Attorney, Agent, or Firm*—Bruce Cottrell

[57] ABSTRACT

The thermosetting powder coating composition which has good stability and gives good physical properties, such as exterior durability, appearance, flexibility, hardness, solvent resistance and corrosion resistance, is disclosed. The composition comprises a co-reactable particulate mixture of a carboxylic acid group-containing polyester and a beta-hydroxylalkylamide.

9 Claims, No Drawings

HYDROXYALKYLAMIDE POWDER COATING CURING SYSTEM

The present invention relates to thermosetting powder coating compositions and, more particularly, to powder coating compositions which have good exterior durability.

BACKGROUND OF THE INVENTION

Powder coating compositions for use in painting are extremely desirable. Such coating compositions greatly reduce and can even eliminate organic solvents used in liquid paints. When powder coating compositions are cured by heating, little, if any, volatile material is given off to the surrounding environment. This is a significant advantage over liquid paints in which organic solvent is volatilized into the atmosphere when the paint is cured by heating.

Powder coating compositions formulated with a polyester polymer are especially useful for their corrosion resistance and exterior durability. Powder coating compositions including a carboxylic acid-functional polyester and triglycidyl isocyanurate (TGIC) as a curing agent are common. Although these powder coating compositions give useful coatings with good properties, they are expensive to formulate because of the cost of the TGIC. Also, TGIC presents the formulation with a toxicity problem and requires relatively high cure temperatures of from about 360° Fahrenheit (F.) to about 400° F.

SUMMARY OF THE INVENTION

In accordance with the present invention, a thermosetting powder coating composition is provided. The composition comprises a carboxylic acid group-containing polyester having a Tg of from about 30° C. to about 85° C. and an acid number of from about 20 to about 80, and a beta-hydroxyalkylamide curing agent.

The powder coating compositions of this invention cure at significantly lower temperatures than compositions with TGIC and give resultant coatings with good exterior durability plus a good blend of other physical properties such as appearance, hardness, impact resistance and chemical resistance.

DETAILED DESCRIPTION OF THE INVENTION

The powder coating compositions of the present invention comprise an intimate mixture of an amorphous carboxylic acid group-containing polyester and a beta-hydroxyalkylamide.

The carboxylic acid group-containing polyester contributes flexibility, impact resistance, and corrosion resistance to the powder coating composition of the present invention. Among the carboxylic acid group-containing polyesters which may be used are those based on a condensation reaction of aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane, and the like. Suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid, and anhydrides of such acids.

The polyol and the acid or anhydride are reacted together with an excess of acid over alcohol so as to form a polyester which has free carboxylic groups. Preferably, the carboxylic acid group-containing polyester will have an acid number of from about 20 to about 80, more preferably from about 30 to about 75, and will be an amorphous solid at room temperature. The polyester is further characterized as having a Tg of from about 30° C. to about 85° C., preferably from about 40° C. to about 75° C.

The Tg of a polymer is a measure of the hardness and melt flow of the polymer. The higher the Tg, the less the melt flow and the harder the coating. Tg is described in *Principles of Polymer Chemistry* (1953), Cornell University Press. The Tg can be actually measured or it can be calculated as described by Fox in *Bull. Amer. Physics Soc.*, 1, 3, page 123 (1956). Tg, as used herein, refers to actually measured values. For measurement of the Tg of a polymer, differential scanning calorimetry (DSC) can be used (a rate of heating of 10° C. per minute, with Tg taken at the first influxation point).

If the Tg of the polyester is below 30° C., the polymer and a powder coating composition including such a polymer can tend to be sticky and difficult to handle. If the Tg is above 85° C., the melt flow of the polyester is low and the coating may have poor appearance.

The other essential ingredient in the powder coating compositions of the present invention is a beta-hydroxyalkylamide. The beta-hydroxyalkylamide is a curing agent for the acid-functional polyester. The beta-hydroxyalkylamide can help provide a crosslink polymer network which is hard, durable, corrosion-resistant and solvent-resistant. It is believed the beta-hydroxyalkylamides cure the coating through an esterification reaction with the carboxy-containing polyester to form multiple ester linkages. The hydroxyl functionality of the beta-hydroxyalkylamide should be on an average basis at least two, preferably greater than two, and more preferably from greater than two up to about four in order to obtain optimum curing response.

The beta-hydroxyalkylamide materials can be depicted structurally as follows:

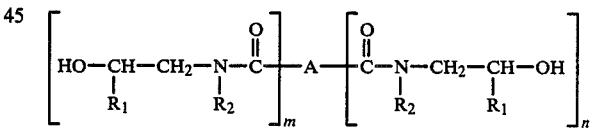

wherein $R_1$ is H or $C_1$–$C_5$ alkyl; $R_2$ is H, $C_1$–$C_5$ alkyl or:

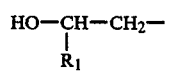

wherein $R_1$ is as described above; A is a bond, monovalent or polyvalent organic radical derived from a saturated, unsaturated or aromatic hydrocarbon including substituted hydrocarbon radicals containing from 2 to 20 carbon atoms, m is equal to 1 to 2, n is equal to 0 or 2, and m+n is at least 2, preferably greater than 2, usually within the range of from 2 up to and including 4. Preferably, A is an alkylene radical —$(CH_2)_x$— where x is from 2 to 12, preferably from 4 to 10.

The beta-hydroxyalkylamide can be prepared by reacting a lower alkyl ester or mixture of esters of carboxylic acids with a beta-hydroxyalkylamine at a temperature ranging from ambient temperature up to about 200° C. depending on the choice of reactants and the presence or absence of a catalyst. Suitable catalysts, include base catalysts such as sodium methoxide, potassium methoxide, sodium butoxide, potassium butoxide, sodium hydroxide, potassium hydroxide and the like, present in amounts of about 0.1 to about 1 percent by weight based on the weight of the alkyl ester.

To bring about the most effective cure of the powder coating composition, the equivalent ratio of beta-hydroxyalkylamide (hydroxy equivalents) to carboxy-containing polyester (carboxylic acid equivalents) is preferably from about 0.6 to 1.6:1, more preferably from 0.8 to 1.3:1. Ratios outside the range of 0.6 to 1.6:1 are undesirable because of poor cure.

The powder coating composition can further include a crystalline carboxylic acid group-containing material selected from the group of $C_4$ to $C_{20}$ aliphatic polycarboxylic acids, polymeric polyanhydrides, low molecular weight polyesters having an acid equivalent weight from about 150 to about 600 and mixtures thereof. This crystalline material can provide for additional flexibility and/or impact resistance in the resultant coating as well as assisting in the flow of the powder coating during cure thereby providing for smooth, glossy coatings.

Among the aliphatic polycarboxylic acids which may be used are included dicarboxylic acids such as adipic acid, suberic acid, azelaic acid, sebacic acid and dodecanedioic acid. Preferably, the aliphatic dicarboxylic acid contains an even number of carbon atoms. Dodecanedioic acid is the preferred aliphatic polybasic acid.

The polymer polyanhydride includes those of the structure:

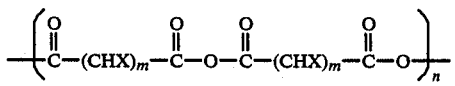

where X is equal to H, $CH_3$, $C_2H_5$ and m equals 4 to 12 and n is of such a value that the molecular weight of the polymeric polyanhydride is in the range of about 400 to about 2,500, preferably about 600 to about 1,200 on a number average basis. Molecular weights greater than 2,500 are undesirable because of a tendency to cause poor stability in the coating composition. Examples of suitable polymeric polyanhydrides are poly(adipic anhydride), poly(azelaic anhydride), poly(sebacic anhydride), poly(dodecanedioic anhydride) and mixed acid anhydrides.

The polymeric polyanhydride can be prepared by heating the acid precursor from which the anhydride is derived with a simple anhydride, such as acetic anhydride, and removing the evolved acid (acetic) which is generated under vacuum. Preferably, the acid contains an even number of carbon atoms.

The low molecular weight carboxylic acid group-containing polyester generally has an acid equivalent weight from about 150 to about 600. Such a polyester is crystalline and generally has a number average molecular weight from about 300 to about 1,200. The low molecular weight polyesters which may be used include condensation products of aliphatic polyols, preferably aliphatic diols, and aliphatic and/or aromatic polycarboxylic acids, preferably dicarboxylic acids. Examples of suitable aliphatic polyols include 1,2-ethanediol, 1,3-propanediol, 1,4-butanediol, 1,6-hexanediol neopentyl glycol, cyclohexane dimethanol, trimethylolpropane and the like. Preferably, the aliphatic polyol is a diol such as 1,2-ethanediol, 1,3-propanediol, 1,4-butanediol or 1,6-hexanediol. Suitable polycarboxylic acids include aliphatic dicarboxylic acids, preferably $C_4$ to $C_{20}$ dicarboxylic acids such as succinic acid, adipic acid, azelaic acid, sebacic acid, dodecanedioic acid, undecanedioic acid, and aromatic dicarboxylic acids such as terephthalic acid, isophthalic acid, and phthalic acid. Preferably, the polycarboxylic acid is an aliphatic dicarboxylic acid containing from about 6 to 12 carbon atoms. Mixtures of such polycarboxylic acids or aliphatic polyols may also be used.

The ingredients are reacted together at an equivalent ratio of diol to diacid of from about 1:2 to about 2:3, preferably at about 1:2 so as to control the molecular weight in the range from about 300 to about 1,200 (number average). The resultant low molecular weight polyester has an acid number of about 75 to about 375 (i.e., an acid equivalent weight of about 150 to about 600) and is a crystalline solid at room temperature. Further, the resultant crystalline polyester material has a melting range of from about 50° C. to about 110° C., preferably from about 70° C. to about 110° C.

The molecular weights of the polyesters are determined by gel permeation chromatography (GPC) using a polystyrene standard. Therefore, it is not the actual molecular weight which is measured but an indication of the molecular weight as compared to polystyrene. The values which are obtained are commonly referred to as polystyrene numbers; however, for the purposes of this application, they are referred to as number average molecular weights.

The amount of the crystalline carboxylic acid group-containing material in the powder coating composition can vary from 0 to about 25 percent by weight, and, where present, preferably from about 5 to about 20 percent by weight based on total resin solids. Amounts greater than 25 percent by weight are undesirable because of increased powder stability problems.

The coating composition may also contain certain other additives that are typically incorporated into powder coating compositions such as pigments, flow control agents, anti-popping agents, powder flow additives, and light stabilizers.

In order to give the powder coating compositions a suitable color, a pigment can be included in the coating composition typically in amounts from about 1 to about 50 percent by weight, based on the total weight of the powder coating composition. Pigments which are suitable for powder coating compositions may be organic or inorganic and include basic lead silica chromate, titanium dioxide, ultramarine blue, phthalocyanine blue, phthalocyanine green, carbon black, black iron oxide, chromium green oxide, ferrite yellow and quinto red.

Suitable as flow control agents are acrylic polymers, such as polylauryl acrylate, polybutyl acrylate, poly(2-ethylhexyl) acrylate, poly(ethyl-2-ethylhexyl) acrylate, polylauryl methacrylate, polyisodecyl methacrylate and the like, and fluorinated polymers such as esters of polyethylene glycol or polypropylene glycol with fluorinated fatty acids, e.g., an ester of polyethylene glycol having a molecular weight over about 2,500 and perfluorooctanoic acid. Polymeric siloxanes with molecular weights over 1,000 may also be used as a flow control agent, for example, polydimethylsiloxane or poly(methylphenyl)siloxane. The flow control agents can aid in reduction of surface tension during heating of the powder and in eliminating crater formation. Generally, the flow control agent, when used, is present in amounts from about 0.05 to about 5 percent by weight based on the total weight of the powder coating composition.

Anti-popping agents can be added to the compositions to allow any volatile material present to escape from the film during baking. Benzoin is a highly preferred degassing agent and when used is present amounts ranging from about 0.5 to about 3 percent by weight based on total weight of the powder coating composition. The powder coating compositions may also preferably contain UV absorbing agents, such as TINUVIN, which when used are typically present in the compositions in amounts of about 0.5 to about 6 percent by weight based on the total weight of the powder coating composition.

In addition, the powder coating composition may contain fumed silica or the like as a powder flow additive to reduce caking of the powder during storage. An example of fumed silica is sold by Gabot Corporation under the trademark CAB-O-SIL ®. The powder flow additive, when used, is generally present in amounts ranging from about 0.1 to about 0.5 percent by weight based on the total weight of the powder coating composition. The powder flow additive is generally added to the particulate powder coating composition after preparation of the particulate mixture.

The thermosetting powder coating compositions are prepared by melt blending the ingredients of the coating composition. This can be accomplished by first blending in a high shear or high-intensity dry mixer, e.g., a Wellex mixer, and then melt blending the mixture in an extruder at a temperature from about 80° C. to about 130° C. The extrudate is then cooled and pulverized into a powder. The powder coating composition can be applied directly to metal such as steel or aluminum, glass, plastic, or fiber-reinforced plastic substrates.

Application of the powder can be by electrostatic spraying or by the use of a fluidized bed. Electrostatic spraying is preferred. The powder coating composition can be applied in one pass or in several passes to provide a film thickness after cure of about 0.5 to about 5 mils. Preferably, to provide a high-quality finish at reasonable cost, the thickness of the powder coating is from about 1.2 to about 4 mils, preferably from about 1.4 to about 3 mils.

The substrate to be coated can optionally be preheated prior to application of the powder to promote a more uniform powder deposition. Upon application of the powder, the powder-coated substrate can be baked typically at from about 300° F. to about 400° F. (149° C. to 204° C.) for about 5 to about 60 minutes, preferably about 20 to about 40 minutes.

The present invention will be more fully understood from the following illustrative examples wherein all quantities, percentages and ratios are on a weight basis unless otherwise indicated.

The following Examples (A-D) show the preparation of various hydroxyalkylamide curing agents, carboxylic acid-functional polyesters and carboxylic acid-functional acrylic polymers which are used in preparing thermosetting powder coating compositions.

EXAMPLE A

Bis[N,N-di(beta-hydroxyethyl)]adipamide-glutaramide was prepared from the following mixture of ingredients.

| Ingredients | Parts by Weight (grams) |
|---|---|
| 90/10 weight ratio of dimethyl adipate/dimethyl glutarate | 2491.4 |
| Diethanolamine | 3635.6 |
| Potassium hydroxide | 12.0 |

The ingredients were charged to a reaction vessel and heated to about 100° C. at which point the distillation of methanol began. Reaction was continued while distilling methanol (a total of 590 g) until a temperature of 111° C. was reached. A partial vacuum (150 millimeters of mercury) was applied to the reaction vessel and an additional 275 g of methanol was removed. About 865 g of fresh methanol was then added to the reaction vessel, followed by addition of 4,800 milliliters (ml) of acetone. As the reaction mixture cooled, the hydroxyalkylamide precipitated. The precipitate was filtered, washed with acetone and air dried to yield a reaction product melting at about 114° C. to about 118° C.

EXAMPLE B

An amorphous carboxylic acid group-containing polyester was prepared from the following ingredients:

| Ingredients | Parts by Weight (grams) |
|---|---|
| Charge 1 | |
| Neopentyl glycol | 2379 |
| Trimethylolpropane | 302 |
| Hexahydrophthalic anhydride | 3759 |
| Dibutyltin oxide | 7 |
| Charge 2 | |
| Hexahydrophthalic anhydride | 560 |

Charge 1 was heated in a reaction vessel including a nitrogen sparge to about 240° C. and held until the acid number dropped below a value of 3.0. Then, the reaction mixture was cooled to about 150° C.; Charge 2 was added; and the reaction mixture held at about 150° C. for two hours. The resultant product had an acid number of 35.7, a hydroxyl number of about 0.5, a total solids of 100 percent as measured at 110° C. for two hours and a number average molecular weight of about 4,585.

EXAMPLE C

An amorphous carboxylic acid group-containing polyester was prepared from the following ingredients:

| Ingredients | Parts by Weight (grams) |
|---|---|
| Charge 1 | |
| Neopentyl glycol | 1088 |
| Trimethylolpropane | 138 |
| Hexahydrophthalic anhydride | 1719 |
| Dibutyltin oxide | 3 |
| Charge 2 | |
| Hexahydrophthalic anhydride | 256 |

Charge 1 was heated to about 240° C. in a reaction vessel including a nitrogen sparge and held until the acid number dropped below a value of 3.0. Then, the reaction mixture was cooled to about 150° C.; Charge 2 was added; and the resultant mixture held at about 150° C. for two hours. The resultant product had an acid number of 36.6, a hydroxyl number of about 5.2, a total solids of 100 percent as measured at 110° C. for two hours and a number average molecular weight of about 3,535.

EXAMPLE D

A carboxylic acid group-containing acrylic polymer was prepared from the following ingredients:

| Ingredients | Parts by Weight (grams) |
| --- | --- |
| Reaction Charge | |
| Xylene | 800.0 |
| Initiator Charge | |
| Ditertiarybutyl peroxide | 36.0 |
| Xylene | 64.0 |
| Monomer Charge | |
| Styrene | 945.4 |
| Methyl methacrylate | 432.9 |
| Butyl acrylate | 251.6 |
| Methacrylic acid | 220.1 |
| Mercaptopropionic acid | 27.8 |

The reactor charge was heated under a nitrogen atmosphere to reflux. The initiator charge and monomer charge were then added slowly and simultaneously to the reactor charge over a period of about three hours while keeping the reaction mixture at reflux. After the feeds of the initiator charge and monomer charge were completed, a rinse charge of 100 g xylene was added. Then, the reaction mixture was held for two hours at reflux followed by cooling. Finally, the reaction mixture was heated to reflux, 81 g of sebacic acid was added, and heating continued under vacuum to remove solvent. The resultant reaction product had a solids content of 99.7 percent (measured at 150° C. for two hours), an acid value of 94.4, a number average molecular weight of 4,513 and a weight average molecular weight of 10,956; the molecular weights being determined by gel permeation chromatography using a polystyrene standard.

The following examples are of thermosetting pigmented powder coating compositions.

EXAMPLE 1

A pigmented powder coating composition including beta-hydroxyalkylamide curing agent and, for comparison, a clear powder coating composition including triglycidyl isocyanurate as the curing agent were prepared from the following mixture of ingredients:

| Ingredients | Parts by Weight (grams) | |
| --- | --- | --- |
| | A | B |
| Carboxylic acid group-containing polyester[1] | 500.0 | 943.9 |
| Hydroxyalkylamide of Example A | 29.7 | — |
| Triglycidyl isocyanurate | — | 59.6 |
| Benzoin | 4.4 | 8.0 |
| MODAFLOW III[2] | 6.8 | 13.8 |
| IRGANOX 1076[3] | 11.0 | 20.0 |
| Titanium dioxide | 137.5 | — |
| Carbon black | 1.4 | — |

[1]A polyester having an acid number of from 33 to 37 and a Tg of 60° C., available as P3600 from D.S.M. Company.
[2]MODAFLOW III is poly(ethyl-2-ethylhexyl)acrylate on a silica carrier, available from Monsanto Company.
[3]IRGANOX 1076 is a polyphenol stabilizer that inhibits oxidation, available from Ciba-Geigy Corporation.

The formulation ingredients were blended in a high-intensity mixer and then melt blended in a Baker Perkins twin screw extruder at 110° C. The extrudate was chilled and flaked on a chill roller, ground in a micromill and sieved through a 140-mesh screen. The resultant powder was then electrostatically sprayed onto grounded steel panels using an electrostatic spray gun. The coated panels were then baked for 15 minutes at about 191° C. to form hard glossy coatings. The properties of the resultant coating are reported in Table 1 below.

EXAMPLE 2

Pigmented powder coating compositions were prepared from the following mixtures of ingredients to compare a composition including the beta-hydroxyalkylamide with a composition including triglycidylisocyanurate as the curative.

| Ingredients | Parts by Weight (grams) | |
| --- | --- | --- |
| | A | B |
| Carboxylic acid group-containing polyester of Example B | 625.0 | 625.0 |
| Beta-hydroxyalkylamide of Example A | 86.5 | — |
| Triglycidyl isocyanurate | — | 92.0 |
| Additive blend[1] | 53.8 | 53.8 |
| Carboxylic acid group-containing acrylic polymer of Example D | 23.2 | 23.2 |
| Organic red pigment[2] | 55.9 | 55.9 |
| Titanium dioxide | 8.8 | 8.8 |
| Organic yellow pigment[3] | 13.3 | 13.3 |
| Organic orange pigment[4] | 14.8 | 14.8 |

[1]A preblend containing 10.10 percent benzoin, 17.75 percent MODAFLOW III, 28.86 percent IRGANOX 1076, 14.43 percent TINUVIN 900 and 28.86 percent TINUVIN 144, on a by weight basis, TINUVIN 900 and 144 are available from Ciba-Geigy Corporation.
[2]Available as F2RK70 from Hoeschst Corporation.
[3]Available from Hoeschst Corporation.

The formulation ingredients of each respective sample were blended in a high-intensity mixer and then melt blended in a Baker Perkins twin screw extruder at 110° C. The extrudate was chilled and flaked on a chill roller, ground in a micromill and sieved through a 140-mesh screen. The resultant powders were electrostatically sprayed onto grounded steel panels. The coated panels were baked for 15 minutes at about 204° C. to form hard glossy coatings. The powder coating formulation with the TGIC did not cure well under these conditions. The properties of the coating from the respective formulations are given in Table 1 below. It can be seen that the powder coating with the beta-hydroxyalkylamide provided superior impact resistance compared to the powder coating formulation with the TGIC. In addition, QUV exposure was conducted by exposing the coated panels to alternating cycles of UV light and condensing humidity in Q-U-V-Accelerated Weathering Tester manufactured by the Q-Panel Company. The UV light was generated with a UVB313 lamp (320–280 nanometers). The temperature of the UV light cycle was 70° C. The temperature of the condensing humidity cycle was 50° C. After 1,473 light hours, the coating with the beta-hydroxyalkylamide showed no loss of gloss.

EXAMPLE 3

A pigmented powder coating composition was prepared from the following mixture of ingredients:

| Ingredients | Parts by Weight (grams) |
|---|---|
| Carboxylic acid group-containing aliphatic polyester of Example C | 406.3 |
| Dodecanedioic acid | 21.6 |
| Beta-hydroxyalkylamide of Example A | 44.4 |
| Additive blend[1] | 32.9 |
| Titanium dioxide | 94.4 |
| Carbon black | 0.26 |

[1] As in Example 2.

The formulation ingredients were blended in a high-intensity mixer and then melt blended in a Baker Perkins twin screw extruder at 110° C. The extrudate was chilled and flaked on a chill roller, ground in a micromill and sieved through a 140-mesh screen. The resultant powder was then electrostatically sprayed onto grounded steel panels using an electrostatic spray gun. The coated panels were then baked for about 15 minutes at about 191° C. to form hard glossy coatings. The properties of the resultant coating are reported in Table 1 below.

EXAMPLE 4

A pigmented powder coating composition was prepared from the following mixture of ingredients:

| Ingredients | Parts by Weight (grams) |
|---|---|
| P3600 polyester | 496.5 |
| Dodecanedioic acid | 39.7 |
| Beta-hydroxyalkylamide of Example A | 63.8 |
| Additive blend[1] | 41.8 |
| Titanium dioxide | 120.0 |
| Carbon black | 0.6 |

[1] As in Example 2.

The formulation ingredients were blended in a high-intensity mixer and then melt blended in a Baker Perkins twin screw extruder at 110° C. The extrudate was chilled and flaked on a chill roller, ground in a micromill and sieved through a 140-mesh screen. The resultant powder was then electrostatically sprayed onto grounded steel panels using an electrostatic spray gun. The coated panels were then baked for about 15 minutes at about 191° C. to form hard glossy coatings. The properties of the resultant coating are reported in Table 1 below.

TABLE 1

| Example No. | Direct Impact Resistance[1] in Inch-Pounds (coating thickness in mils) | | Mandrel Bend[2] | Pencil[3] Hardness | Initial[4] Gloss | | Salt Spray[5] |
|---|---|---|---|---|---|---|---|
| | Direct | Reverse | | | 20° | 60° | |
| 1A | 100(2.6) | 40(2.6) | 0"/0" | — | — | 95 | — |
| 1B | 80(2.6) | 10(2.6) | 0"/0" | H | — | 99 | — |
| 2A | 120(2.0) | 80(2.0) | 0"/0" | H | 64 | 89 | ¼" |
| 2B | 20(2.0) | 0(2.0) | 4"/4" | H | 68 | 90 | failed |
| 3 | 160(1.9) | 160(1.9) | 0"/0" | F | 47 | 81 | failed |
| 4 | 160(2.9) | 160(2.9) | 0"/0" | H | 91 | 98 | 1/16" |

TEST PROCEDURES (1) The impact resistance was measured with a Gardner Impact Tester. The coated panels were subjected to increasing amounts of impact until the coating cracked. The panel was impacted on the coating side, i.e., direct impact, and also on the side of the coated panel opposite the coating, i.e., reverse impact. The results are reported in inch-pounds and the thickness of the coating in mils is shown in the parenthesis.

(2) The mandrel bend test involved bending coated panels (4"×12") around a ⅛-inch mandrel and measuring cracking/delamination in inches along the bend line.

(3) Pencil hardness was determined by taking pencils of increasing hardness (from F to 4H), and attempting to etch a scribe mark in the coating. The hardness of the first pencil that would etch the coating is reported as the pencil hardness of the film.

(4) The 20° and 60° gloss were measured with glass meters manufactured by the Gardner Instrument Company.

(5) The salt spray corrosion resistance was measured by scribing the cured coated panels with an "X" and exposing the scribed panels to a salt spray fog at 100° F. (38° C.) as generally described in ASTM D-117 for 500 hours. The panels were removed from the chamber, dried, the scribe mark taped with masking tape, the tape pulled off at a 45° angle and the creepage from the scribe mark measured. Creepage is the rusted darkened area of the panel where the coating has lifted from the panel surface.

Although the present invention has been described with reference to specific detail, it is not intended that such details should be regarded as limitations upon the scope of the invention except as and to the extent that they are included in the accompanying claims.

What is claimed is:

1. A thermosetting powder coating composition comprising a co-reactable particulate mixture of:
    (a) a carboxylic acid group-containing polyester based on a condensation reaction of aliphatic polyols and/or cycloaliphatic polyols with aliphatic and/or aromatic polycarboxylic acids and anhydrides, said polyester having a Tg in the range of about 30° C. to about 85° C. and an acid number of from about 20 to about 80; and
    (b) a beta-hydroxyalkylamide, the equivalent ratio of beta-hydroxyalkylamide equivalents to carboxylic acid equivalents being within the range of 0.6 to 1.6:1.

2. The composition of claim 1 wherein the carboxylic acid group-containing polyester is characterized as having a Tg from about 40° C. to about 75° C. and an acid number of from about 30 to about 75.

3. The composition of claim 1 in which the hydroxylalkylamide is of the structure:

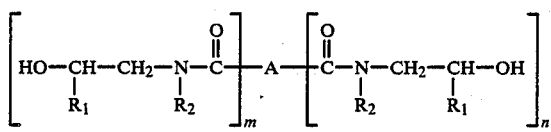

where $R_1$ is H or $C_1$–$C_5$ alkyl; $R_2$ is H, $C_1$–$C_5$ alkyl or:

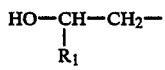

wherein $R_1$ is as described above and A is a chemical bond or monovalent or polyvalent organic radical derived from saturated, unsaturated or aromatic hydrocarbon radicals including substituted hydrocarbon radicals containing from 2 to 20 carbon atoms, m equals 1 to 2, n equals 0 to 2 and m+n is at least 2.

4. The composition of claim 2 in which the hydroxylalkylamide is of the structure:

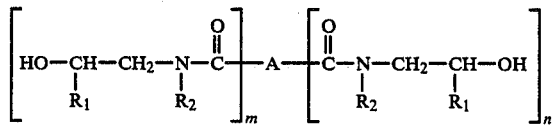

where $R_1$ is H or $C_1$–$C_5$ alkyl; $R_2$ is H, $C_1$–$C_5$ alkyl or:

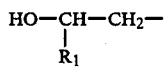

wherein $R_1$ is as described above and A is a chemical bond or monovalent or polyvalent organic radical derived from saturated, unsaturated or aromatic hydrocarbon radicals including substituted hydrocarbon radicals containing from 2 to 20 carbon atoms, m equals 1 to 2, n equals 0 to 2 and m+n is at least 2.

5. The composition of claim 1 which further includes a crystalline carboxylic acid group-containing material selected from the group consisting of a polymeric polyanhydride, a polyester having a number average molecular weight from about 300 to about 1,200 and an acid equivalent weight of from about 150 to about 600, and mixtures thereof.

6. The composition of claim 1 which further includes a crystalline carboxylic acid group-containing material selected from the group consisting of adipic acid, suberic acid, azelaic acid, sebacic acid and dodecanedioic acid.

7. The composition of claim 1 which further includes dodecanedioic acid.

8. The composition of claim 6 which further includes a crystalline carboxylic acid group-containing material selected from the group consisting of a polymeric polyanhydride, a polyester having a number average molecular weight from about 300 to about 1,200 and an acid equivalent weight of from about 150 to about 600, and mixtures thereof.

9. The composition of claim 7 which further includes a crystalline carboxylic acid group-containing material selected from the group consisting of a polymeric polyanhydride, a polyester having a number average molecular weight from about 300 to about 1,200 and an acid equivalent weight of from about 150 to about 600, and mixtures thereof.

* * * * *